INVENTOR
JOHN PARSONS FRENCK

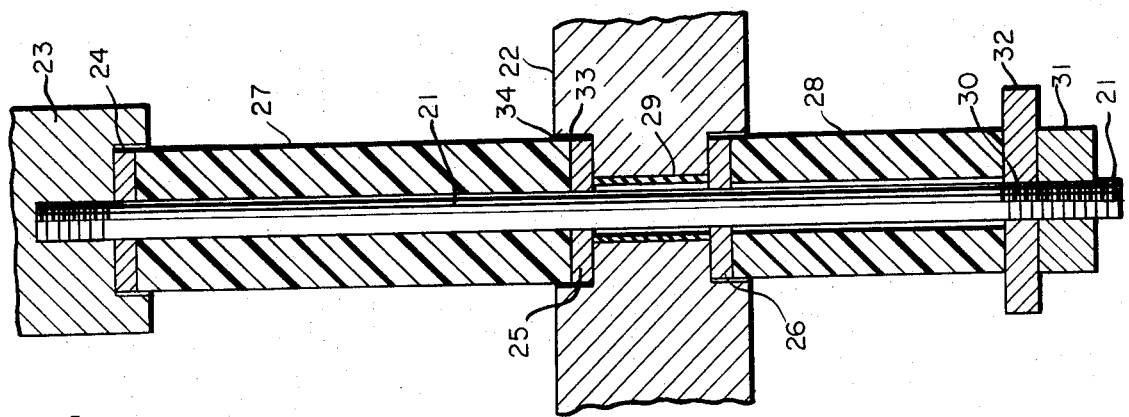
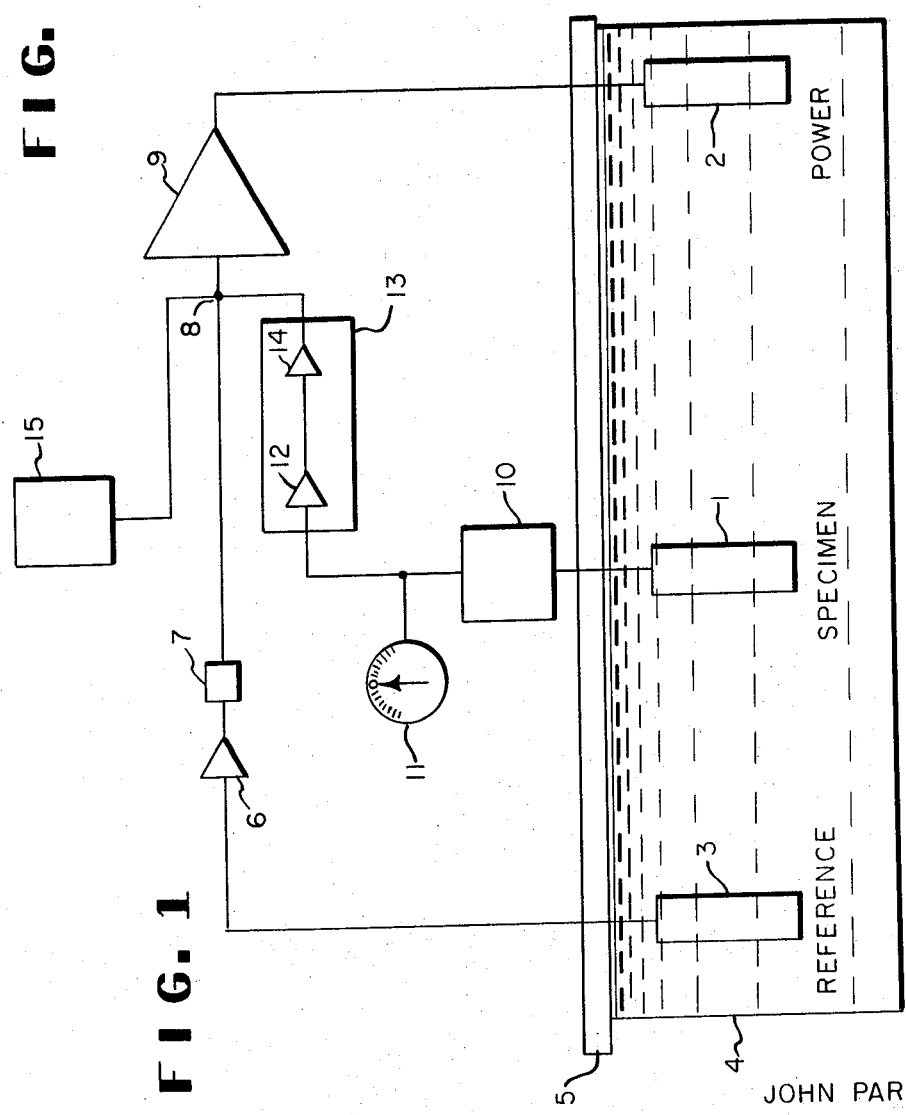

BY Theodore C. Gregory
ATTORNEY

United States Patent Office 3,788,962
Patented Jan. 29, 1974

1

3,788,962
APPARATUS FOR MONITORING THE CORROSION RATE OF METAL BY THE POLARIZATION RESISTANCE METHOD
John Parsons Frenck, Newark, Del., assignor to E. I. du Pont de Nemours and Company, Wilmington, Del.
Filed Nov. 11, 1971, Ser. No. 197,876
Int. Cl. G01n 27/46
U.S. Cl. 204—195 C
1 Claim

ABSTRACT OF THE DISCLOSURE

An apparatus for monitoring the corrosion rate of metal in a plant stream by its polarization resistance featuring automatic means to reduce current flow through a metal specimen electrode before subjecting it to programmed polarization potentials. Spurious signals due to circuit oscillation are limited by using a current-to-voltage transducer that introduces essentially zero impedance in the current circuit to produce a functional voltage proportional to specimen electrode current. The functional voltage indicates corrosion rate by meter and alarm, and is inverted and amplified at moderate gain to provide an automatic current reduction signal through an isolating sample-and-hold circuit. By a timing sequence the summing point of an operational amplifier receives both an input proportional to the inverted and amplified functional voltage and a continuously transmitted reference voltage from a freely corroding reference electrode during a first time period. Additional programmed polarization voltages are introduced for summing during a second time period to establish polarization resistance. Circuit stability resulting from the use of low impedance components and restricted transmission of oscillations between circuit loops permits reliable monitoring of the corrosion of a wide variety of troublesome passive metals that form thin oxide films of high electrical capacity.

BACKGROUND OF THE INVENTION

(1) Field of the invention

This invention relates to an electrochemical apparatus useful in monitoring the corrosion rate of metal vessels and piping in corrosive, ionically conductive liquid plant streams. More specifically this invention relates to an improved electrochemical apparatus that permits automatic and reliable indication of a sudden increase in the rate of corrosion of a normally passive metal by correlation with a change in its electrical polarization characteristics.

(2) Description of the prior art

One of the relatively new techniques for measuring minute by minute changes in the corrosion rate of a metal is based on a proportionality which was found to exist between the instantaneous corrosion rate and the change in current resulting from a unit change in electric potential. The instantaneous corrosion rate is therefore said to be inversely proportional to a polarization resistance by which is meant the electrical resistance associated with a small current that does not disturb the overall polarization characteristics of a freely corroding metal. In practice the current seems small enough for the reciprocal relationship between corrosion rate and polarization resistance to hold when the potential change is restricted to 10–20 millivolts. Care should always be exercised that a side reaction does not enter to interfere with the corrosion reaction as a result of the potential change.

To measure polarization resistance in the field, corrosion rate meters should contain at least a specimen electrode and a power electrode to complete an electrical circuit. A third electrode through which no current flows is frequently used for reference in establishing the potential of the freely corroding metal. Input to the power electrode then changes the potential of the specimen electrode just a few millivolts from the potential of the reference electrode. Several values are usually selected such as ± millivolts, or the potential may even be changed continuously over such a range to verify the existence of a constant linear relation between current and voltage, i.e., a single-valued polarization resistance. According to established findings the resultant small current measured in the immediate external circuit of the specimen electrode can be assumed to be proportional to corrosion rate.

An apparatus for corrosion rate determination is described in U.S. Pat. 3,406,101 with a means for passing a controlled and measured amount of a polarizing current through the power electrode and the test specimen, said means comprising a source of direct current, a circuit, accurate current controlling means, e.g., a voltage divider, a calibrated ammeter, and a means for metering a predetermined amount of polarization of the test specimen with respect to a reference electrode. The current is measured with a microammeter of variable range. Circuit impedance and hence a tendency of the circuit to oscillate varies as the required range is selected, so much so that readings of the corrosion rates of metals such as aluminum, tantalum, or even certain types of stainless steel occasionally vary widely from one scale to another. The more troublesome metals seem to be those that tend to form thin oxide layers of the passive type useful in electrolytic capacitors. The accompanying oscillations in the current circuit loop are readily observable with an oscilloscope.

U.S. Pat. 3,250,689 to Seyl (May 10, 1966) discloses an apparatus for determining the corrosion rate of metallic materials and several classes of voltage delivery systems according to whether a voltage is supplied to the power electrode by a potentiometer of (a) low resistance, (b) intermediate resistance, or (c) high resistance. All are said to produce prompt approach of the current-potential relationship of the specimen electrode toward equilibrium. Despite this assurance, the voltage regulation and the current response are acknowledged to be marked functions of the impedance of the voltage delivery system, and a suggestion is even made that adjustment be made to the potentiometer arm after applying the voltage to produce a definite extent of voltage regulation. This need for more than minimum attention arises because of spurious transient currents that arise in a circuit prone to natural oscillations, particularly a circuit containing any high impedance component.

It is an objective of the present invention to provide an apparatus that reliably monitors corrosion rates of metals, particularly passive metals that tend to form thin, highly capacitive oxide films. It is another objective of the present invention to avoid unwanted oscillations in all circuit loops, particularly in the current circuit containing the specimen electrode. Still another objective is to provide a stable apparatus in which oscillations cannot propagate readily from the current circuit to an automatic current reduction circuit. A further objective is to provide an apparatus that requires minimum attention, sounding an alarm in case of a process upset.

SUMMARY OF THE INVENTION

Now in accordance with the invention an apparatus has been found for monitoring the rate of corrosion of an electronic conductor in a liquid ionic conductor which comprises (A) test probe means including three electrodes, the electronic conductor as a specimen electrode, a power electrode to complete an electrical circuit with the specimen electrode, and a freely corroding reference electrode at a separation distance sufficient to exclude voltage produced by resistance of the liquid ionic conductor to current flowing to the specimen electrode, said test probe means being adapted to be immersed in said liquid ionic conductor, (B) means for summing a plurality of voltages including a stored voltage, polarization voltage and reference voltage, for application to the power electrode, thereby effecting current flow through the specimen electrode, (C) current-to-voltage transducer means by which said current supplies a functional voltage, said transducer introducing essentially zero impedance in the current path, (D) means for indicating said functional voltage thereby providing a reliable measure of the instantaneous corrosion rate of the metal of the specimen electrode, (E) automatic current reduction whereby
(1) the functional voltage is inverted and amplified,
(2) a stored voltage equal to the inverted and amplified functional voltage is established during a first time period, and
(3) the value of the stored voltage is transmitted to the voltage summing means during a second time period, (F) programming means for applying polarization voltage to the voltage summing means during the second time period, and (G) means for transmitting a reference voltage supplied by the freely corroding reference electrode to the voltage summing means during the first and second time periods.

Elemental metals and their alloys typify electronic conductors, but the electronic conductors of this invention include substances which do not have metallic properties, as carbon and graphite, and certain chemical compounds as oxides and sulfides and are limited only by its ability to conduct direct current by electron flow.

A liquid ionic conductor of this invention comprises an electrolyte dissolved in an ionizing solvent which conducts D.C. current by the flow of positive ions in one direction and the flow of negative ions in the opposite direction.

By "freely corroding" is meant free of disturbances produced by or momentarily resulting from externally produced current.

A current-to-voltage transducer is a device actuated by current flow in one system so as to supply voltage to a second system.

By "inverting" is meant changing from a positive value to a negative value, or conversely, thereby reversing in relation to a specified reference so as to be able to detract from or even nullify the original value.

A polarization voltage perturbs a freely corroding electrode by intentionally passing a D.C. current through the interface between the electrode and the liquid ionic conductor so as to affect the electrochemical corrosion reaction by ion formation and discharge, e.g., a square wave polarization voltage alternately favors formation and discharge of the same ions but possibly unequally because of the intrinsic nature of the electrochemical reactions involved.

The apparatus of this invention is distinguishable over the art in including automatic means to reduce current flow through a metal specimen electrode before subjecting it to programmed polarization potentials.

It is also distinguishable over the art in achieving automatic current reduction in a manner such that spurious signals that can cause erroneous conclusions about corrosion rate are neither generated nor propagated to the extent prevailing in ordinary corrosion rate meters based on polarization resistance measurement.

These advantages are achieved by the conjoint use of (1) a current-to-voltage transducer that introduces essentially zero impedance to the specimen electrode, thereby avoiding a condition known to promote undesirable circuit oscillation, and (2) two-stage isolation of the voltage delivery system from the current circuit by (a) the transducer means itself and (b) a sample-and-hold circuit for storage of a voltage signal and transmission of the stored voltage signal for automatic current reduction.

The advantage of the apparatus of this invention resides primarily in the reliability of its performance in monitoring the corrosion rates of metals that are troublesome to ordinary meters. Such metals include stainless steel, "Inconel" nickel-chromium alloys and aluminum.

The invention will be better understood by reference to the drawings.

FIG. 1 is a schematic block diagram illustrating the apparatus of this invention with the essential components for the monitoring of the corrosion rate of a metal by its polarization resistance.

FIG. 2 is a sectional drawing showing the mounting or insertion of a single electrical connection of the apparatus of this invention into an enclosure or plant vessel whose inner surface is recessed to receive the three electrodes of the test probe means.

Figure 3:
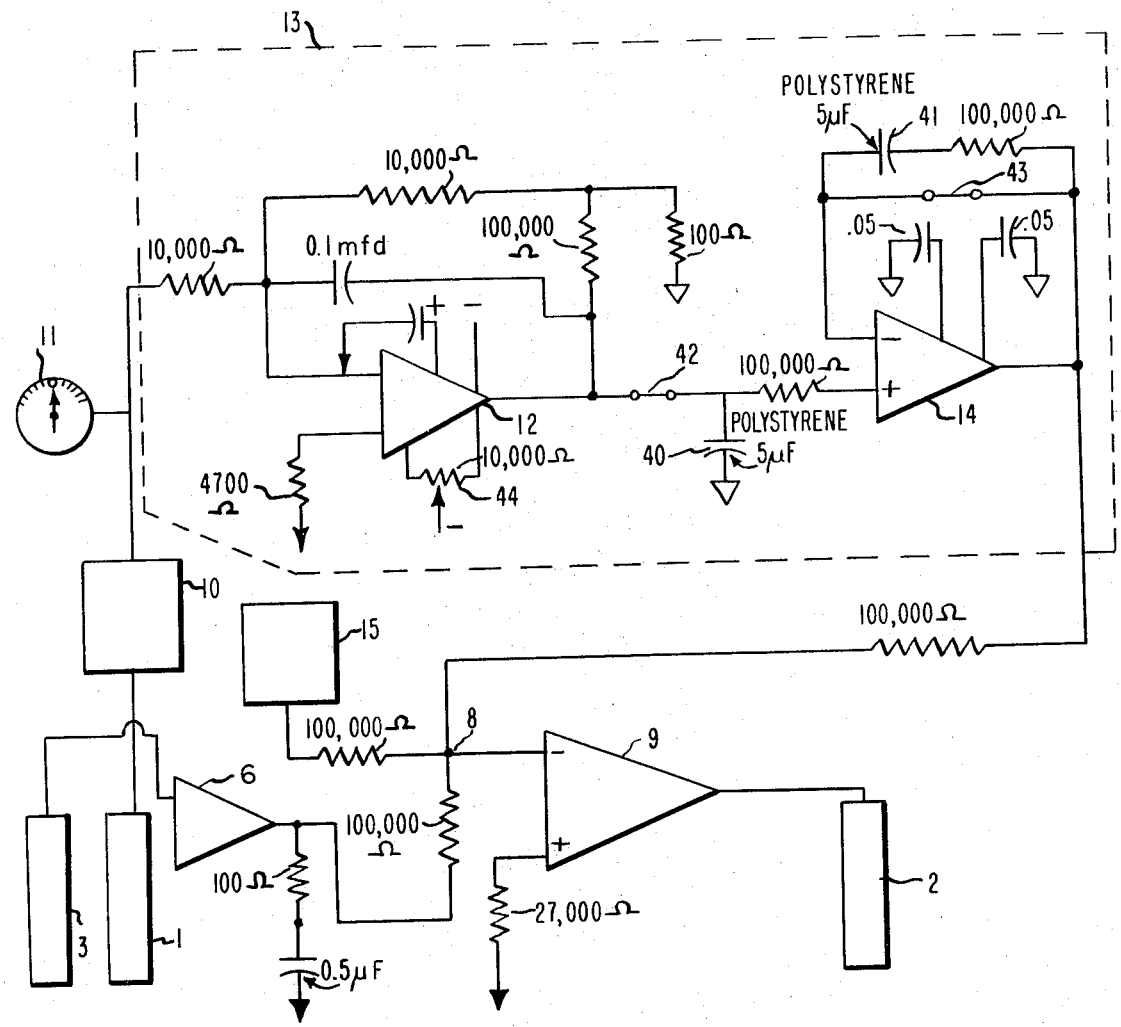
FIG. 3 is an expanded block diagram of the corrosion monitor apparatus schematically illustrating the electronic circuitry for automatic current reduction, showing representative values of passive circuit elements such as resistors and capacitors.

Referring now to FIG. 1, three metal electrodes 1, 2 and 3 are immersed in ionically conductive liquid 4. Metal electrode 1 constitutes a specimen electrode through which current is passed, metal electrode 2 constitutes a power electrode through which current is passed and metal electrode 3 constitutes a reference electrode through which no current passes. The electrodes when mounted on base support 5 form a test probe means for insertion into a body of liquid maintained at a desired pressure, temperature, concentration and rate of circulation.

The specimen electrode 1 is normally not at the same electrical potential as the freely corroding reference electrode 3. A difference may occur for more than one reason, for example, the two electrodes may be composed of different metals forming an electromotive couple or battery. Measurement of a potential shift of the specimen electrode 1 from a desired freely-corroding condition can be discerned quite readily as a perturbation of battery potential; in fact, in a practical field instrument used with highly corrosive liquids a reference electrode of the same metal as the specimen electrode becomes just an additional problem, so that a different more stable metal may be preferred for reference.

The choice of identical metal for the specimen and reference electrodes while satisfactory may still allow differences in the freely corroding potential to occur. In identical electrodes exposed to seemingly identical conditions differences in the freely corroding potential can occur because of variations in the circulation rate of the liquid, deposits on the electrodes and corrosion products. For such reasons an adjustment of the potential of the specimen electrode relative to the reference electrode is generally required to reduce the current flowing through the specimen electrode to approach a freely corroding condition, i.e., no net external current flow.

Adjustment of specimen electrode potential is accomplished in two steps in this invention. This potential of the freely corroding reference electrode relative to ground potential is fed by a high impedance buffer amplifier 6 to the summing point 8 of an operational amplifier 9. Low pass frequency filter 7 at the output of the buffer amplifier effectively damps out any spurious high frequency oscillations in the reference amplifier circuit. The output of operational amplifier 9 is impressed upon the power electrode 2.

The second step is required when appreciable current nevertheless is flowing between the power and specimen electrodes. Such current flowing through the current-to-voltage transducer 10 gives rise to a proportionate functional voltage which is indicated by a deviation of the needle of meter 11 from a zero reading. To reduce such deviation the functional voltage is inverted and amplified in the first section 12 of the automatic current reduction means 13 for transmission to the summing point 8 and during such transmission a stored voltage equal in value to the inverted and amplified function voltage is established in the second section 14.

At a later time by use of relays as will be explained, the value of the stored voltage is transmitted to the summing point 8 of operational amplifier 9. As a result of inverting the functional voltage to a negative value, summing with the reference voltage reduces the current through the specimen electrode. The meter needle moves toward zero, and the specimen electrode takes on a potential close to but not necessarily equal to that of the reference electrode for the reasons mentioned above. This concludes a first time period required for adjustment of the specimen electrode toward a freely-corroding condition required for polarization resistance measurement.

Subsequent measurement of polarization resistance proceeds by introducing a third signal from programmed source of potential 15 at the voltage summing point 8 which alters the summed potential previously determined by just the reference and current circuit signals, e.g., the potential is first increased about ten millivolts and the change in the reading of meter 11 observed, then the summed potential is reduced by the same number of millivolts and the change in the reading of meter 11 in the opposite direction is observed. The change in potential is kept small to avoid departing from the linear relationship known to exist between voltage and current change near the potential of a freely corroding electrode surface. The ratio of voltage to current change is called the polarization resistance and is inversely proportional to the corrosion rate of the metal as determined by calibration against the weight lost by an electrode of fixed surface area.

The electrodes used in the apparatus are of any electrically conductive material. They may be of any convenient size and shape, and it is best that they be rigidly mounted in substantially parallel relationship. The electrodes may be mounted on pipe-plugs or other fittings to permit their installation in pressure vessels, pipes and the like. The probe will normally be immersed in liquid ionic conductor capable of moderate electrolytic conduction, e.g. in chemical plant process streams having resistivities normally not much greater than $10^6$ ohm-cm.

A process vessel or pipe is normally provided with a retaining wall that has a hole through it into which the flange fitting or pipe plug bearing the three substantially parallel electrodes is fitted. An electrical connection must be made to each of the electrodes, and is normally inserted through a minimum of space into the vessel under conditions such as elevated temperature, pressure, vacuum, and corrosive environment. Many electrodes fail because the gasket material for the electrical connection when exposed to such conditions loses its integrity and extrudes from its intended position. A second cause of failure is a buildup of deposits or sludge between electrode areas, or between one electrode area and the mounting flange if the flange is electrically conductive.

A preferred corrosion monitor seal for the apparatus of this invention therefore essentially encloses the gasket material in an enclosure recessed so that exposure is minimized and presents a relatively long shorting path on which deposits build, both features being shown in FIG. 2.

The invention therefore includes the apparatus of the invention for monitoring the rate of corrosion of an electronic conductor described above in combination with an enclosure having an inner metallic surface, said three electrodes of the test probe means each having an electrical conductor extending through a hole in the enclosure, a resilient gasket of electrically insulated material sealably enclosing the conductor and biased against the inner metallic surface, a rigid electrical insulation enclosing the conductor and biased against the resilient gasket, and biasing means on the conductor to bias the rigid insulator against the resilient gasket, said inner metallic surface of the enclosure being recessed to receive each of the three electrodes and to accommodate the resilient gasket and the rigid electrical insulator of each electrode, said recess providing an annular clearance between the resilient gasket and the enclosure small enough to prevent the resilient gasket from extruding through such clearance when said gasket is subjected to conditions existing within the enclosure.

Referring now to FIG. 2, electrical conductor 21, consisting of a through-bolt extends through an enclosure or a vessel retaining will 22 having an inner metallic surface to make electrical contact with the specimen 23. Resilient gaskets 24, 25 and 26 sealably enclose the conductor 21 and are biased against the vessel wall 22 and ceramic spacers 27 and 28 which act as rigid electrical insulators enclosing the conductor 21 and biasing against the gaskets 24, 25 and 26. An insulating sleeve 29 electrically insulates the electrical conductor 21 from the enclosure 22. Together the thread 30, nut 31, and washer 32 bias the rigid ceramic insulators 27 and 28 against the resilient gaskets 24, 25 and 27, providing the improvement wherein the enclosure 22 has a recess 33 which accommodates the resilient gasket 25 and the rigid insulator 27 with annular clearance 34 between the resilient gasket and the enclosure small enough to prevent resilient gasket 25 from extruding through such clearance 34.

The probe into the vessel contains three such seals, one for each of the three electrodes 1, 2 and 3 that are shown in FIG. 1 in a linear spacial relationship. The three probes may be arranged in triangular relation or in any configuration in which the reference electrode 3 is separated by a separation distance from the specimen electrode 1 sufficient to exclude voltage produced by the resistance of the plant stream to current flowing from the power electrode 2 to the specimen electrode 1. This separation distance is at least ¼-inch and can be several inches, a preferred value being ½-inch.

Amplifiers shown in FIG. 1 are normally commerically available integrated circuit operational amplifiers such as Fairchild's $\mu$, A747C or equivalent. The minus input terminal of such a Fairchild amplifier 9 acts as the summing point for three voltages in this invention, (1) the reference voltage
(2) the inverted and amplified functional voltage derived from a current-to-voltage transducer to be described hereafter, and
(3) the programmed polarization voltage. The input impedances of these three signals are normally isolated as shown in FIG. 3 by inserting some value such as 100,000 ohms of resistance into each input lead. With such isolation the form of a polarizing voltage such as a square wave can be transmitted with integrity by the summing amplifier 9 to the power electrode 2 and via liquid ionic conductor 4 to the specimen electrode 1.

Voltage reference for all three input voltages is to ground potential established at amplifiers 6, 10 and as convenient at amplifier 15 to achieve a symmetrical programmed polarization potential, e.g., a square wave centered about ground potential.

The amplifier 10 in FIGS. 1 and 3 is a commercially available transconductance amplifier such as a National Semiconductor Corporation LM308 unit selected because of its low bias current (0.4 nanoampere). Such current is a source of error because the meter responds to it the same as specimen electrode current.

Current detection range may be set by a suitable of feedback resistors placed between the output terminal and the negative input terminal of the amplifier according to the relationship $E=IR$, where E is the range of meter (or alarm) employed, e.g., ±50 millivolts about a center zero. For an anticipated maximum current range of 2000 microamperes the smallest feedback resistor would be 25 ohms.

This current-to-voltage transducer presents essentially zero input impedance to the specimen electrode 1, thereby avoiding oscillations that can lead to incorrect (lower) current values using current detectors of higher impedance such as microammeters with shunts or measuring the voltage drop across a calibrated resistor.

The purpose of the current-to-voltage transducer is to produce a functional voltage that (a) is indicated by the meter 11, thereby providing a reliable measure of the instantaneous corrosion rate of the metal of the specimen electrode, and (b) serves as signal input into automatic current reduction means 13 that remains electrically isolated from the current circuit by the nature of the transducer employed.

Referring now to FIG. 3, a dashed line 13 is drawn around two operational amplifiers 12 and 14, associated resistors and capacitors for normal operation of the amplifiers, two special 5 microfarad low leakage rate polystyrene capacitors 40 and 41, and two ganged relays 42 and 43 which determine the time separation of storage and transmission of a stored voltage signal in the automatic current reduction means.

Amplifier 12 is operated in an inverting mode so as to make positive voltage input a negative output at a moderate gain. Normally a gain of about 1000 is satisfactory. The range is not critical. Ordinary use of maximum input and feedback resistances and addition of direct feedback capacitance in this first section causes undesirable 60 hertz pickup, but the combination shown of 10,000 ohm input resistances, a divider-type feedback and 0.1 $\mu f$. capacitance performs satisfactorily over a wide polarization current range up to 2000 microamperes. The 10,000 ohm offset potentiometer 44 is set during the initial operation so as to null the meter at zero.

Amplifier 14, preferably a high input impedance type such as an Analog Devices' 501 B unit, operates as a unity gain amplifier when relays 42 and 43 are closed during a first time period passing a voltage signal to the summing point 8. Capacitor 40 charges to and tracks the voltage being thus applied to achieve a null reading on the meter. Relays 42 and 43 then open and the amplifier 14 locks on the voltage stored on the charged capacitor 40 and continues to transmit that voltage to the voltage summing point 8. Once the relay 42 is open, variations at the output of amplifier 12, equivalent essentially to those at the specimen electrode, are not transmitted as they were during the first time period.

Several factors minimize voltage drops, i.e., characteristic voltage decrease, as charge drains away from capacitor 40 during this second time period. The amplifier is a field effect transistor (FET) unit with an input impedance of $10^{12}$ ohms. The time constant for discharge is the product of the input resistor 100,000 ohms and $5 \times 10^{-6}$ farads, i.e., 0.5 second falls to $1/e^{th}$ of the voltage to which the capacitor is initially charged, in practice a drop of several hundred millivolts per second. A capacitor 41 of identical value is therefore introduced into the feedback loop when ganged relay 42 opens with relay 43. Charge decays from both capacitors effectively cancel so that the output voltage to the specimen electrode 2 remains essentially constant.

Programming means 15 generates a cyclic polarizing signal. In any one cycle no polarizing voltage is generated during a first time period which can be as many seconds as may be required to store a voltage equal to the inverted and amplified functional voltage on capacitor 40. This can be a very short subsecond time limited only by the rise times of electronic components, but is normally many seconds to extend the life of relays such as 42 and 43.

At the beginning of the second time period the relay 42 must open before the capacitor 40 can sense the application of polarization voltage to the voltage summing point 8. Otherwise, the automatic current reduction means 13 will cancel the polarization voltage applied to the specimen electrode until the programmed polarization voltage again changes. To insure the required synchronization, electrical or mechanical means may be employed to open the relay first. A double-throw relay that breaks-before-it-makes provides an adequate mechanical solution.

The programming of the polarization voltage delivered during the second time period by the source 15 is normally symmetrical and centered about ground potential, e.g., by one-time manual use of a 10,000 ohm offset potentiometer similar to that used at inverting amplifier 12 in FIG. 3. The nature of the wave form may vary. A square wave polarizing signal of 20 millivolts peak-to-peak is sufficient, but other wave forms containing short rest periods of no voltage before and between the half waves of the square wave are equally useful.

The duration of the second time period is bounded like the first time period by response time and by the required monitoring interval to safeguard against undetected corrosive failure of the vessel or piping system, a minimum time for long relay life being about 10 seconds of anodic polarization, followed by 10 seconds of cathodic polarization. Normally the second time period is several minutes long. Those acquainted with the art will lengthen the second time period appropriately to allow the specimen electrode ample time to polarize.

Amplifier 6 presents a high impedance, e.g., $10^{10}$ ohms to the reference electrode 3. A suitable choice of amplifier 6 is a National Semiconductor Corporation LM 210 unit. Its high impedance insures that current flow is negligible, hence the reference electrode is freely corroding. The amplifier continuously transmits a reference voltage characteristic of such a condition as if from a zero impedance source through a 100,000 ohm impedance isolating resistor to the voltage summing point 8. High frequency components in the signal are bypassed to ground, however, as shown in FIG. 3 through a 100 ohm resistor in series with an 0.5 $\mu f$. capacitor thereby damping out spurious oscillations in the reference circuit that otherwise might be transmitted to the specimen current circuit through impedance paths in the ionic conductor 4. The bypass to ground together with the 100,000 ohm series resistor comprise the low pass frequency filter 7 shown in FIG. 1.

As mentioned heretofore a dissimilar metal may be used for the reference electrode. The novel operation of the automatic current reduction means permits operation with large potential differences between the reference and specimen electrodes such as would be encountered with dissimilar metals, or with a calomel electrode and a metallic electrode.

The apparatus of this invention is extremely useful in the laboratory or plant for measuring corrosion rate on a minute-to-minute basis. It is capable of monitoring the nickel-chromium alloys, the stainless steels, "Inconel" and aluminum that form thin, highly capacitive oxide layers. Ordinary meters tend to oscillate and give spurious readings with such a metal. The apparatus is useful in protecting metal-lined equipment by indicating any increases in corrosion rate by meter and process upsets by alarm so that appropriate corrective action may be taken.

The following examples are intended to further illustrate the invention.

EXAMPLE 1

This example is illustrative of the invention but was not actually conducted with the apparatus of the invention.

An apparatus as illustrated in FIGS. 1, 2 and 3 and described above is constructed and fitted with a test probe means consisting of three ¼ in. tantalum tube metal electrodes inserted into an autoclave with an inner surface of tantalum containing a gaseous atmosphere using "Teflon" polytetrafluoroethylene recessed gaskets for sealing purposes as shown in FIG. 2. After pulling the test probe means together with a throughbolt the pressure in the autoclave is increased to 210 p.s.i.g. without leakage. An 82% sulfuric acid corrosive liquid bath heated to the temperatures shown in Table I is brought into contact with the test probe means, and the apparatus is used as described above to determine corrosion rate in mils of thickness lost per year (m.p.y.), using values of current density in microamperes per cm.² of electrode surface to calculate polarization resistance, $R_p$, as shown in the table.

TABLE

| Liquid | Atmosphere | Liquid temp. (°C.) | Pressure (p.s.i.g.) | Current density (μA./cm.²) | Polarization resistance | Corrosion rate, M.P.Y.[1] |
|---|---|---|---|---|---|---|
| 82% H₂SO₄ | N₂ | 180 | 210 | .05 | .2×10⁶ | .02 |
| 82% H₂SO₄ | N₂ | 200 | 210 | .50 | .02×10⁶ | .3 |
| 82% H₂SO₄ | N₂ | 220 | 210 | 1.3 | .0077×10⁶ | .8 |
| 82% H₂SO₄ | HCl | 180 | 210 | .25 | .04×10⁶ | .1 |
| 82% H₂SO₄ | HCl | 200 | 210 | 1.0 | .01×10⁶ | .5 |
| 82% H₂SO₄ | HCl | 220 | 210 | 1.8 | .005×10⁶ | 1.0 |
| 82% H₂SO₄ | N₂ | 180 | 210 | .03 | .33×10⁶ | .2 |
| 82% H₂SO₄ | N₂ | 160 | 210 | .01 | 1.0×10⁶ | .01 |

[1] Mils per year.

EXAMPLE 2

Example 1 was repeated using a commercially available apparatus which contained means for passing a controlled and measured amount of a polarizing current through the power electrode as described in U.S. Pat. 3,406,101 to Kilpatrick. For a low rate corrosion condition such that the apparatus of this invention described in Example 1 gave a correct reading of less than 0.1 m.p.y., the apparatus of Example 2 indicated a rate of 50 m.p.y. on the high range scale and 3 m.p.y. on the low range scale, the problem being traced to oscillations in the specimen current circuit.

The foregoing detailed description has been given for clarity of understanding only and no unnecessary limitations are to be understood therefrom. The invention is not limited to exact details shown and described for obvious modifications will occur to one skilled in the art.

What is claimed is:

1. An apparatus for monitoring the rate of corrosion of an electronic conductor in a liquid ionic conductor, mounted in an enclosure having an inner metallic surface, said apparatus comprising
   (A) test probe means including three electrodes, an electronic conductor as a specimen electrode, a power electrode to complete an electrical circuit with the specimen electrode, and a freely corroding reference electrode at a separation distance sufficient to exclude voltage produced by resistance of the liquid ionic conductor to current flowing to the specimen electrode, each of said electrodes having:
      (1) an electrical conductor extending through a hole in the enclosure;
      (2) a resilient gasket of electrically insulating material sealably enclosing the conductor and biased against the inner metallic surface;
      (3) a rigid electrical insulator enclosing the conductor and biased against said resilient gasket; and
      (4) biasing means on the conductor to bias said rigid insulator against said resilient gasket; and said inner metallic surface of the enclosure being recessed to receive each of the three electrodes and to accommodate the resilient gasket and the rigid electrical insulator of each electrode, said recess providing an annular clearance between the resilient gasket and the enclosure small enough to prevent the resilient gasket from extruding through such clearance when said gasket is subjected to conditions existing within the enclosure,
   said test probe means being adapted to be immersed in said liquid ionic conductor,
   (B) means for summing a plurality of voltages including a stored voltage, polarization voltage and reference voltage, for application to the power electrode, thereby effecting current flow through the specimen electrode,
   (C) current-to-voltage transducer means by which said current supplies a functional voltage, said transducer introducing essentially zero impedance in the current path,
   (D) means for indicating said functional voltage thereby providing a reliable measure of the instantaneous corrosion rate of the metal of the specimen electrode,
   (E) automatic current reduction means for
      (1) inversion and amplification of the functional voltage,
      (2) establishment, during a first time period of a stored voltage equal to the functional voltage after its inversion and amplification,
      (3) transmission, during a second time period, of the stored voltage to the voltage summing means,
   (F) programming means for applying polarization voltage to the voltage summing means during the second time period, and
   (G) means for transmitting a reference voltage supplied by the freely corroding reference electrode to the voltage summing means during the first and second time periods.

References Cited
UNITED STATES PATENTS

| | | | |
|---|---|---|---|
| 3,250,689 | 5/1966 | Seyl | 204—1 T |
| 3,406,101 | 10/1968 | Kilpatrick | 204—195 C |
| 3,558,462 | 1/1971 | Wilson | 204—195 C |
| 3,661,751 | 5/1972 | Wilson | 204—195 C |

TA-HSUNG TUNG, Primary Examiner

U.S. Cl. X.R.

324—71 C